United States Patent [19]

Kurihara et al.

[11] 4,086,215

[45] Apr. 25, 1978

[54] CROSSLINKED ORGANIC POLYAMIDE OR POLYHYDRAZINE PERMSELECTIVE POLYMERIC MEMBRANES

[75] Inventors: Masaru Kurihara; Soichi Tokizane; Tatsundo Tanaka; Masamitsu Tanimura; Yoichi Shimokawa, all of Otsu, Japan

[73] Assignee: Toray Industries, Inc., Tokyo, Japan

[21] Appl. No.: 647,138

[22] Filed: Jan. 7, 1976

[30] Foreign Application Priority Data

Jan. 8, 1975 Japan .................................... 50-4459

[51] Int. Cl.$^2$ .............................................. C08G 69/48

[52] U.S. Cl. ................................ 260/78 R; 210/23 H; 260/78 SC

[58] Field of Search .................. 210/23 H; 260/2.2 R, 260/2.1 R, 78 R, 78 SC

[56] References Cited

U.S. PATENT DOCUMENTS

| | | | |
|---|---|---|---|
| 3,904,519 | 9/1975 | McKinney, Jr. et al. | 210/23 H |
| 3,935,172 | 1/1976 | Vogl et al. | 260/30.8 R |
| 3,948,823 | 4/1976 | Lee et al. | 260/78 SC |
| 3,954,607 | 5/1976 | Halling | 210/23 H |
| 3,993,625 | 11/1976 | Kurihora et al. | 260/78 R |

*Primary Examiner*—Joseph L. Schofer
*Assistant Examiner*—Peter F. Kulksky
*Attorney, Agent, or Firm*—Miller & Prestia

[57] ABSTRACT

Permselective membranes are prepared by crosslinking synthetic organic polyamides or polyhydrazides having —$CO_2H$ groups and/or —$SO_3H$ groups with a salt of metal selected from the class consisting of alkaline earth metals, transition metals, aluminum group metals and lead group metals.

The membranes are useful in separating components of fluid mixtures or solutions such as water containing dissolved salts, and are especially useful in producing pure water from saline water.

22 Claims, No Drawings

CROSSLINKED ORGANIC POLYAMIDE OR POLYHYDRAZINE PERMSELECTIVE POLYMERIC MEMBRANES

BACKGROUND OF THE INVENTION

1. Field of the Invention

The present invention relates to a permselective thin membrane prepared from an organic polyamide or polyhydrazide crosslinked by a polyvalent metal. Such membranes are useful for reverse osmosis or ultrafiltration. More particularly, this invention is useful for desalination of sea water or brackish water, and functions to separate waste materials which are the origin of environmental pollution from waste waters, such as products of the dye or pulp industries, for example.

2. Description of the Prior Art

The term "osmosis" is commonly used to describe the spontaneous flow of pure water into saline water, where pure water and saline water are separated by a suitable semi-permeable membrane.

The term "reverse osmosis" is used to describe water flow from saline water into pure water through a membrane when hydrostatic pressure is applied to the saline water in excess of the equilibrium osmosis pressure. When the saline solution is in contact with a permselective membrane the saline water actually becomes more concentrated. Generally, this reverse osmosis process is useful to desalinate sea water and may be applied to waste water treatment and to concentration of food. In the separation of water from such an aqueous solution, the reverse osmosis process has several advantages including operation with low energy expenditures, and operation at room temperature. This is because the water undergoes no phase change, such as from liquid to vapor, as may occur in a distillation process, for example.

Accordingly, the reverse osmosis process is particularly useful for separating materials which are sensitive to deterioration by heat. This process also has merit in that miniaturization of equipment is possible. So it may be said that the reverse osmosis process is very promising compared to other processes, and extensive research has been performed on it in the United States.

It is known that a cellulose acetate membrane, developed by Loeb and Coworkers and described in U.S. Pat. Nos. 3,133,132 and 3,133,137 is useful for carrying out the reverse osmosis process. However, cellulose acetate membranes have serious deficiencies in that they have a limited operating life and are easily hydrolyzed (deacetylated) during operation. This prohibits their widespread application.

In recent years, alternate permselective membrane materials have been actively sought and suggested. For example, membranes made from polyacrylonitrile, polyhydroxyethylacrylate, polyvinylalcohol and polyvinylidene carbonate have been suggested. However, these membranes are inferior to cellulose acetate membranes in permselectivity and in water permeability as well.

More recently, the applications of new polymeric materials developed for thermalstable polymers such as aromatic polyamides, polyamide-hydrazides, polysulphones, polyphenylene oxides, for permselective membranes, have been actively tried. For example, aromatic polyamide and polyamide-hydrazide membranes are described in U.S. Pat. Nos. 3,567,632 and in Am. Chem. Soc. Polymer Preprints 16, 2,365,385 (1972). During operation these membranes exhibit improved properties, both mechanical and chemical, in comparison with cellulose acetate. However, they have "low water flux" because of their low permeability to water.

Polysulphones and polyphenylethers themselves are not good materials for reverse osmosis, but introduction of hydrophilic groups into the polymer main chain makes them useful as permselective membranes, according to the description in Am. Chem. Soc. Polymer Preprints 16, No. 2,276 (1972).

In spite of their improved mechanical and chemical properties, however, their permselectivity and permeability are still inadequate in comparison with cellulose acetate. Accordingly, efforts have been made without success to obtain a membrane having high water-flux and low salt passage, and having improved mechanical and chemical properties.

New series of polyamides and polyhydrazides which contain pendant ionic groups in their polymer chains were developed in order to attain unexpectedly higher water flux membranes (U.S. patent application Ser. No. 472,446, now U.S. Pat. No. 3,993,625).

An object of the present invention is to improve both the water flux and the durability of a membrane such as just described above.

Water flux depends upon hydrostatic pressure, solute concentration (osmotic pressure), temperature and also compaction of membrane due to applied pressure. The flux decline, expressed in terms of operation time, is expressed as follows:

$$\log x = \log A + m \log T$$

where $x$ and $A$ are water flux after one day and after $T$ days, respectively, and $m$ is a parameter of flux change. The $m$-value is usually a little below zero, which means a gradual decrease of flux with time. In order to realize the most economical operation, the $m$-value should be zero or nearest to zero.

One way to improve the $m$-value is to crosslink the membrane polymer, which makes the membrane durable against creep. One of such examples is crosslinking of cellulose acetate by incorporating cellulose methacrylate (Polymer Preprints 12 No. 2, 284 (1971)). That procedure, however, provides improvement of $m$-value at the expense of water flux.

The present invention contributes a significant improvement of $m$-value together with water flux increase only through crosslinking polyamides and polyhydrazide with polyvalent ions.

DESCRIPTION OF THE INVENTION

It has now been discovered that an excellent permselective membrane having a high water-flux and excellent durability, which is particularly useful for desalination of sea water or brackish water, can be prepared by treating synthetic organic polyamides or polyhydrazides having pendant ionic groups with metal salts.

Said polyamides or polyhydrazides are aromatic or alicyclic polymers containing amide bonds —CON< and/or hydrazide bonds —CONHNHCO— in their main chains and pendant ionic groups selected from the class consisting of $—CO_2H$ and $—SO_3H$. Polyamides or polyhydrazides which are represented by the following formulas are preferably used in the present invention:

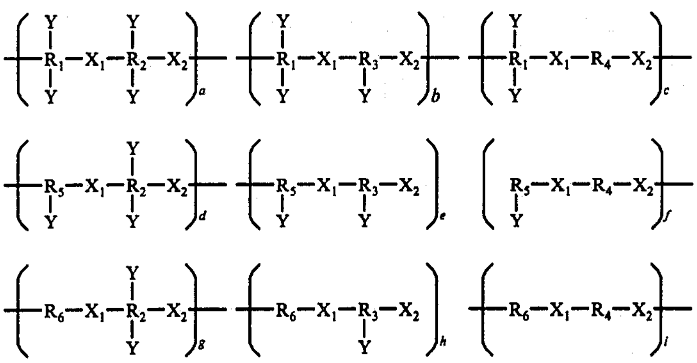

[I]

wherein (a) *a, b, c, d, e, f, g, h* and *i* represent the molar fraction (%) of each component, each being larger than zero or equal to zero, and satisfying the following relations:

$$a + b + c + d + e + f + g + h + i = 100$$

$$a + b + c + d + e + f + g + h > 0$$

(b) $R_1$, $R_2$, $R_3$, $R_4$, $R_5$, and $R_6$ are members selected from the group consisting of carbocyclic aromatic, heterocyclic, and alicyclic groups having 4 to 30 carbon atoms, (c) $X_1$ is a group selected from the class consisting of —NHCO—, —CO— and —CONHNHCO—, wherein in the case of —CO—, it is bonded directly to a nitrogen atom in the heterocycle in $R_1$, $R_5$, or $R_6$.

(d) $X_2$ is a group selected from the class consisting of —CONH—, —CO— and —CONHNHCO— wherein, in the case of —CO—, it is bonded directly to a nitrogen atom in the heterocycle in $R_1$, $R_5$, or $R_6$, (e) Y is a group selected from the class consisting of —COOH and —$SO_3H$, and (f) the polymer has a molecular weight high enough to provide a film.

(1) Description of the Aromatic or Alicyclic Polyamide and Polyhydrazide

The aromatic or alicyclic polyamide and polyhydrazide used to prepare the permselective barriers of this invention can be manufactured by reacting carbocyclic aromatic, heterocyclic, or alicyclic amine or hydrazide components with carbocyclic aromatic, heterocyclic, or alicyclic acid components, according to the usual polycondensation or polyaddition polymerization method, for example, described in "Condensation Polymers by Interfacial and Solution Methods" by P. W. Morgan, Interscience Publishers (1965). The carbocyclic aromatic, heterocyclic, or alicyclic amine or hydrazide components used in the present invention are represented by the following formula:

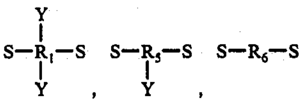

[II] [III] [IV]

wherein $R_1$, $R_5$ and $R_6$ are carbocyclic aromatic, heterocyclic, or alicyclic groups having 4 to 30 carbon atoms, Y is a group selected from the class consisting of —COOH and —$SO_3H$ and S is a functional group which has the capability to react with the acid component and is selected from the class consisting of —$NH_2$, —$CONHNH_2$, and the hydrogen radical, wherein said hydrogen radical is bonded to an N atom in the heterocyclic amine component. Representative examples of $R_1$ are:

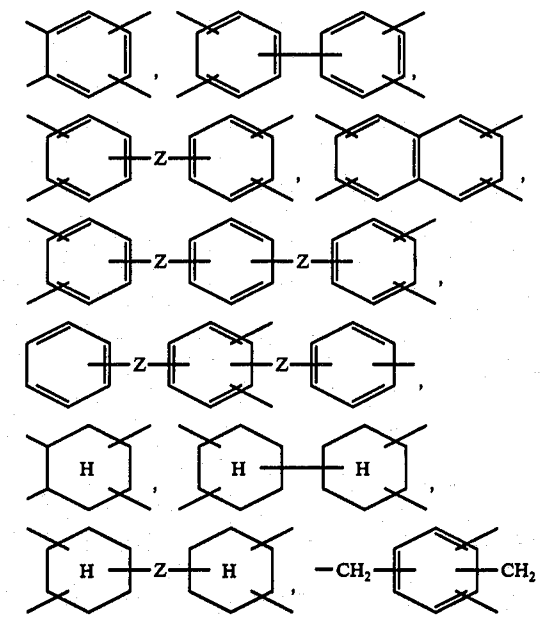

and tetravalent groups containing five or six-membered heterocycle(s) wherein Z is a group selected from the class consisting of an alkylene group (straight or branched chain) of 1-4 carbon atoms, —O—, —NH—, —$SO_2$—, —S—, —CONH—, —COO—, and —NHCOO— which is bound directly to the aromatic or alicyclic nuclei. Representative five or six-membered heterocycles above mentioned are heterocycles having 1-3 heteroatom(s) selected from O, N and S, such as those derived from imidazole, imide, oxadiazole, oxazole, triazole, thiaziazole, thiazole, benzoxazole, benzimidazole, benzthiazole, benzoxazinone, or quinoxaline. Representative examples of $R_5$ are:

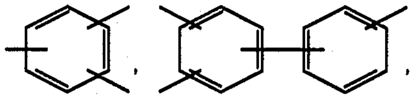

-continued

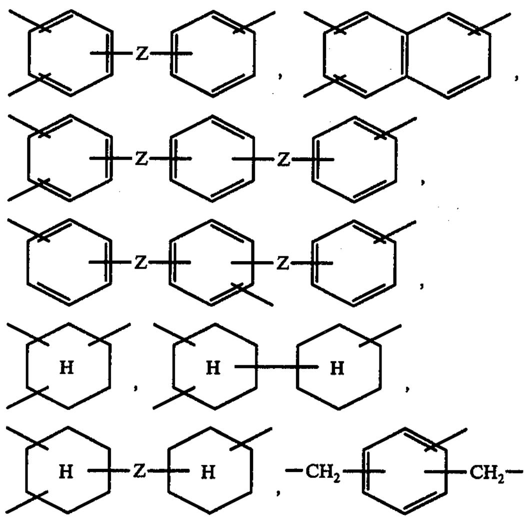

and trivalent groups containing five or six-membered heterocycle(s) wherein Z is the same group defined hereinbefore. Representative five or six-membered heteroxycles are the same as those of $R_1$ mentioned above.

Representative examples of $R_6$ are:

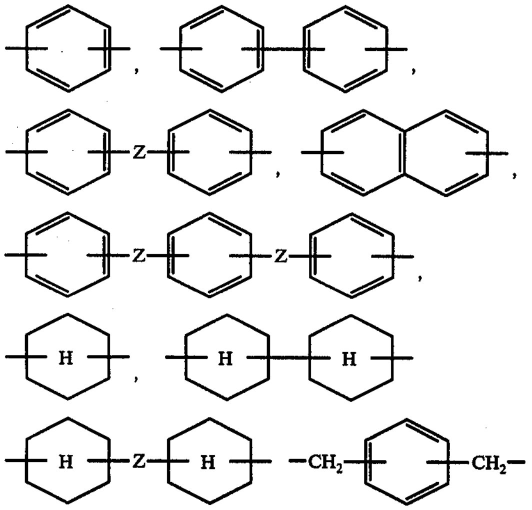

and divalent groups containing five or six-membered heterocycle(s) wherein Z is the same group defined hereinbefore.

Representative five or six-membered heterocycles are the same as those of $R_1$ mentioned above.

In the representative examples of $R_1$, $R_5$ and $R_6$ described above, aromatic or alicyclic nuclei can be substituted by lower alkyl, alkoxyamine, hydroxyl, amino, mono- or di-alkylamino, carboxamide, halogen (F, Cl, Br or I) or trialkyl ammonium ($C_1$–$C_3$) groups.

Preferred amine components represented by the formula [II] are: m-(or p)-dicarboxy phenylenediamine, methylene-bis(anthranic acid), 3,3′-dicarboxy benzidine, 3,3′-dicarboxy-4,4′-diamino-biphenyl ether, 3,3′-disulfonic-4,4′-diaminodiphenyl methane, and 3,3′-disulfonic benzidine.

Preferred amine components represented by the formula [III] are: 2-carboxy-m-(or p)-phenylene diamine, 3-carboxy-m-phenylene diamine, 2-sulfonic-m-(or p)-phenylene diamine, 3-sulfonic-m-phenylene diamine.

Preferred amine components represented by the formula [IV] are: m-(or p)-phenylene diamine, methyl-m-(or p)-phenylene diamine, benzidine, 4,4′-biphenyl ether diamine, methylenebis aniline, 3,3′-dichloro-4,4′-diamino-diphenyl methane, 3,3′-dioxybenzidine, 1,5-naphthalene diamine, 3,3′-dimethylamino-4,4′-diamino biphenyl ether, 3,3′,4′-triamino biphenyl ether, 3,3′,4,4′-tetramino biphenyl ether, N,N′-(4-aminobenzoyl)-m (or p)-phenylene diamine, 2,2′-bis(4-aminophenyl benzimidazole), 2,2′-bis(4-aminophenylbenzoxazole), 2,2′-bis(4-aminophenyl benzothiazole), m (or p)-xylylenediamine, 1,4-cyclohexyldiamine, 2,2-bis (4-amino phenyl) propane, piperazine, terephthaloylhydrazide, isophthaloylhydrazide, and m (or p)-aminophenylhydrazide.

The carbocyclic aromatic, heterocyclic, or alicyclic acid components used in the present invention are represented by the following formula:

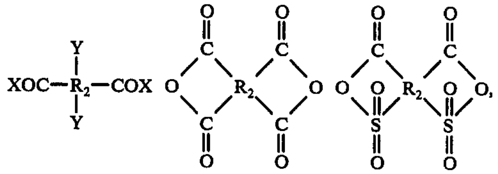

[V] [VI] [VII]

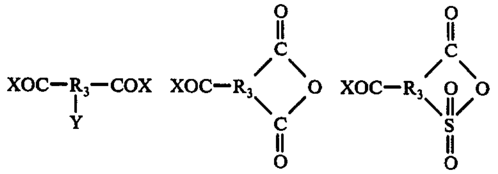

[VIII] [IX] [X]

$XOC—R_4—COX$

[XI]

wherein $R_2$, $R_3$ and $R_4$ are carbocyclic aromatic, heterocyclic, or alicyclic groups having 4 to 30 carbon atoms, X is a halogen radical, and Y is a group selected from the class consisting of —COOH and —$SO_3H$.

Representative examples of $R_2$ are the same as $R_1$ shown hereinbefore.

Representative examples of $R_3$ are the same as $R_5$ shown hereinbefore.

Representative examples of $R_4$ are the same as $R_6$ shown hereinbefore.

In the acid components described above, [VI], [VII], [IX], [X], and [XI] are preferably used.

Preferred acid components represented by the formula [VI] are pyromellitic acid dianhydride, 3, 4, 3′, 4′-tetracarboxybenzophenone dianhydride, and naphthalene-1,4,5,8-tetracarboxylic acid dianhydride.

Preferred acid components represented by the formula [VIII] are 2,4-disulfonic isophthalic acid dianhydride and 2,5-disulfonic terephthalic acid dianhydride.

Preferred acid components represented by the formula [IX] are: 4-chloroformyl phthalic acid anhydride, 5 (or 6)-chloroformyl naphthalene-2,3-dicarboxylic acid anhydride, 3′ (or 4′)-chloroformyl biphenyl-3,4-dicarboxylic acid anhydride, and 3′-chloroformyl benzophenone-3,4-dicarboxylic acid anhydride.

Preferred acid components represented by the formula [X] are:

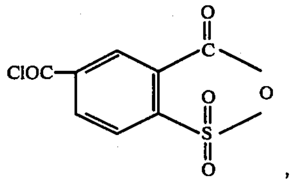

,

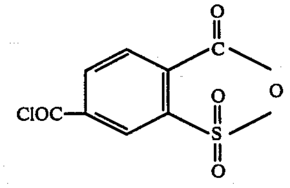

and

,

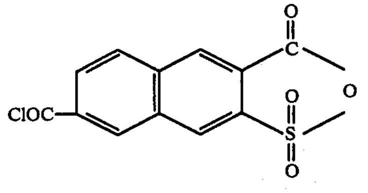

Preferred acid components represented by the formula [XI] are: isophthaloyl chloride, methyl isophthaloyl chloride, terephthaloyl chloride, methyl terephthaloyl chloride, bisbenzoic acid dichloride, diphenylmethane-4,4'-dicarboxylic acid dichloride, diphenylether-4,4'-dicarboxylic acid dichloride, diphenylpropane-4,4'-dicarboxylic acid dichloride, and 2,6 (1,5 or 1,4)-naphthalene dicarboxylic acid dichloride.

The characterizing feature of said polymer is that it contains the particular pendant groups which have been designated "Y" herein, where Y equals to $—CO_2H$ or $—SO_3H$. Their existence makes possible the unexpected increase of membrane performance through crosslinking.

The concentration of such pendant ionic group is defined by its P.I. value, as follows:

$$P.I. = \frac{\text{Total number of pendant ionic groups in a polymer repeating unit.}}{\text{Molecular weight of polymer repeating unit.}}$$

It is preferable that the P.I. value be between $3.5 \times 10^{-4}$ and $1.4 \times 10^{-2}$.

As there are differences between $—CO_2H$ and $—SO_3H$ in ionic effect as well as in polymer solubility, the suitable P.I. values are different as between the two groups.

Generally, the sulfonic group prefers a lower P.I. value and the carboxylic group prefers a higher P.I. value. More preferably, the P.I. value is between about $7 \times 10^{-4}$ and $5 \times 10^{-3}$.

It is preferable in practicing the present invention that the following relationships be satisfied, in addition to the requirement (a) described hereinbefore:

$$a + b + c \geqq 5$$

In this preferred range, the polymers which satisfy the following relationships are generally used:

$$c + i = 100$$

$$100 \geqq c \geqq 5$$

The following range is also preferable.

$$f + i = 100, 100 \geqq f \geqq 10.$$

(2) Manufacture of the Polymer

The manufacture of the polymer in accordance with the present invention is usually achieved by solution polymerization. The solvents to be used in the polymerization process are preferably those which do not react with said amines, hydrazides and acids, and which dissolve at least one of these reactants. Such solvents include dimethyl formamide, dimethyl acetamide, diethyl acetamide, N-methyl pyrrolidone, N-methyl caprolactam, tetramethyl urea, pyridine, dimethyl sulfone, hexamethyl phosphoramide, tetramethyl sulphone, formamide, butyrolactone and N-acetyl pyrrolidone, used either separately or in combination. It is also possible to add benzene, toluene, nitrobenzene, chlorobenzene, dioxane, cyclohexanone or tetrahydrofuran.

To prevent the polymer product from decreasing in viscosity owing to hydrolysis during polymerization, the solvent must be used in a substantially anhydrous condition as far as possible.

The organic solvent should be present in an amount sufficient to dissolve the reactants. Usually, the solvent is used in such amounts that the reactants are contained in an amount of about 0.05% by weight to 50% by weight. The reaction product system, wherein the compound of Formula (I) is formed, may be utilized directly for the formation of polyamide or polyhydrazide without specifically separating the compound of Formula (I).

The applicable reaction temperature is not particularly restricted, so long as it is sufficiently high to induce polymerization.

Usually, it is advantageous to use a temperature of about −40° to 130° C, at which temperature at least about 50% of the resulting polymer can be maintained as a polyamide or polyhydrazide chain without giving rise to the occurrence of a ring-closure reaction. The preferable reaction temperature is in the range from about −20° to 60° C. From the resulting polymer solution the polymer can, if desired, be separated by the use of a non-solvent for the polymer, such as cyclohexanone, benzene, methanol, or dioxane. The viscosity values mentioned in the examples which follow were measured with the use of a dried polymer separated accordingly, unless otherwise described.

It is possible to add an inorganic salt to the solvent to increase the solubility of the polymer in the solvent and to maintain the homogeneity of the polymer solution. As the inorganic salts, lithium chloride, calcium chloride, magnesium carbonate, and zinc chloride are preferably used.

The molecular weight of said polymer is generally in the range of about 3000–100,000, and more preferably in the range of about 5000–50,000 from a practical standpoint.

(3) Membrane Preparation

The permselective barriers of this invention may preferably be prepared in asymmetric membrane form by rinsing a "Protomembrane".

The process for preparing such membrane comprises the step of (a) Casting a dope on a plate, drum, or various supporting material, (b) Partially drying, and (c) Rinsing with a rinse medium, wherein said dope consists essentially of (a) about 5 to 35% (based on the weight of the solvent and polymer) by weight of the organic aromatic polyamide or polyhydrazide represented by the formula [I] as set forth hereinbefore, (b) about 60 to 90% by weight of an organic polar solvent for the polymer, based on the weight of the solvent and polymer, (c) about 1 to 20% by weight of an inorganic salt, based on the weight of the polymer, and (d) not more than about 10% by weight of water based on the weight of the polymer.

The organic solvent for the polymer includes any organic polar solvent or organic polar solvent mixture which dissolves the polymer at or below room temperature, which has a boiling point in the range of about 50°-250° C, and which is easily miscible with the rinse medium, which may be water for example. Especially preferred water miscible, polar, organic solvents include dimethylformamide, dimethylacetamide, N-methyl-2-pyrrolidone, dimethylsulfoxide, hexamethyl phosphoramide and mixtures thereof. The inorganic salts preferably contained in said dope include lithium chloride, lithium bromide, lithium nitrate, calcium chloride, magnesium chloride, etc.

The resulting dope is cast on a plate etc. at about 5° to 50° C in any effective thickness.

Partial drying of the formed dope on a plate or drum, for example, is conducted by evaporation of solvent at about 50°-140° C for a sufficient time to remove about 20 to 80% of the solvent. The term "Protomembrane" is used herein to designate a shaped structure of the formed dope after evaporation. Useful permselective asymmetric membranes are obtained by rinsing the protomembrane with a rinse medium which is essentially a non-solvent for the polymer, which is chemically inert to the polymer, and which dissolves inorganic salts in the dope and is miscible with organic solvents. In the rinsing step most of the solvent and inorganic salt, etc. are extracted. Suitable rinse media include water, methanol, ethanol, ether, hydrocarbons, halogenated hydrocarbons and mixtures thereof, with or without inorganic salts such as lithium chloride, calcium chloride, etc.

The preferred rinse medium is water or water with an inorganic salt.

The protomembrane should be in contact with the rinse medium for sufficient time to extract at least about 80% of the inorganic salt, and at least about 80% of the solvent, generally at about 0°-50° C for about 1 hour. The asymmetric membrane thus obtained has an especially unique characteristic for desalination purposes: the separation of micro molecules such as sodium chloride in sea water. The step of rinsing may be conducted, if necessary, while applying tension to the membrane to eliminate shrinkage. The thin membrane thus obtained has a skin layer on the surface of the membrane, which results in good permselectivity of the asymmetric membrane with the thin skin layer. The asymmetric membrane also has a porous layer which supports the skin layer and through which water can flow easily after passing through the skin layer. This combination of skin layer and porous layer in the membrane is considered to be indispensable for purposes of reverse osmosis.

This asymmetric membrane can be prepared in various forms such as flat films, films fabricated directly on supporting fabrics like polyester or nylon, thin coating on a porous support, hollow fibers with thin walls, and so on.

Other kinds of fabrication techniques exist, such as providing ultrathin dense coatings on porous supports (Composite membranes), which are not asymmetric of themselves.

These films, and supported films and coatings can be fabricated into tubular, flat or spiral modules in practical use.

(4) Membrane Treatment (Crosslinking)

The term "crosslinking" is defined as binding chemically two or more polymer chains together. Generally there are two kinds of crosslinking: ionic crosslinking and covalent crosslinking. The present invention relates to ionic crosslinking, especially crosslinking polymer acids by use of metal ions.

The amount of crosslinked bonding is restricted by the amount of the acid group. In order to realize improved membrane performance the total number of crosslinked bondings (i.e. the total number of crosslinked metals for divalent metal ions) in a polymer repeating unit, defined as the C.B. value, is preferably between about $7.0 \times 10^{-5}$ and $7.0 \times 10^{-3}$. More preferably the C.B. value is between about $1.5 \times 10^{-4}$ and $2.5 \times 10^{-3}$.

The polymer described herein is treated by crosslinking reagents, which are salts of polyvalent metals selected from the class consisting of alkaline earth metals, transition metals, aluminum group metals and lead group metals.

Examples of such metals include Mg, Ca, Ba, Sr, Ti, V, Cr, Mo, W, Mn, Fe, Co, Ni, Pd, Cu, Zn, Cd, Hg, Al, Ga, In, Sn and Pb.

Amont them the following metal ions are preferably used:

$Mg^{2+}$, $Ca^{2+}$, $Ba^{2+}$, $Sr^{2+}$, $TI^{4+}$, $V^{4+}$, $Cr^{3+}$, $Mn^{2+}$, $Fe^{2+}$, $Fe^{3+}$, $Co^{2+}$, $Ni^{2+}$, $Cu^{2+}$, $Zn^{2+}$, $Al^{3+}$, $Sn^{4+}$, $Pb^{2+}$, and $Pb^{4+}$.

These metals are used in the form of metal salts, which must be soluble either in water, alcohols, acetone, other solvents or mixtures thereof which do not in actual practice dissolve or destroy the membrane. Suitable examples of counterions of soluble salts are $OH^-$, $Cl^-$, $ClO_3^-$, $ClO_4^-$, $F^-$, $Br^-$, $I^-$, $NO_3^-$, $NO_2^-$, $SO_4^{2-}$, $HSO_4^-$, $SO_3^{2-}$, $HSO_3^-$, $CO_3^{2-}$, $HCO_3^-$, $PO_4^{3-}$, $HPO_4^{2-}$, $H_2PO_4^-$, acetate ion, oxalate ion, formate ion, benzoate ion, edetate ion, other organic carboxylate ions, sulfonate ion, $CN^-$, $NCS^-$, $S_2O_3^{2-}$, $Fe(CN)_6^{4-}$, $Fe(CN)_6^{3-}$, $SiF_6^{2-}$ and other chelating ions.

Complex salts containing crosslinking metals can also be used, such as complex salts of $NH_4Cl$, KCl, $(NH_4)_2SO_4$, KCl and $(NH_4)_3PO_4$. Oxides and oxysalts may also be used.

The following salts are preferably used:

$MgCl_2$, $(MgCO_3)_4Mg(OH)_2$, $Mg(NO_3)_2$, $(CH_3CO_2)_2Mg$, MgO, $Mg(OH)_2$ $Ca(OH)_2$, $CaCl_2$, $BaCl_2$, CaO $FeCl_3$, $Fe_2(SO_4)_3$, $FeSO_4$, $FeSo_4(NH_4)_2SO_4$, $Fe_2(SO_4)_3(NH_4)_2SO_4$ $Fe(NO_3)_2$ $CuCl_2$, $CuSO_4$, $Cu(OAc)_2$, Cu $(NO_3)_2$ $CoCl_2$, $Co(NO_3)_2$ $NiCl_2$, $NiSO_4$ $ZnCl_2$, $ZnSO_4$ $AlCl_3$, K $Al(SO_4)_2$ $SnCl_4$ $PbCl_2$, $(CH_3CO_2)_2Pb$, $(CH_3CO_2)_4Pb$
$TiCl_4$
$VOCl_2$
$CrCl_3$
$MnCl_2$, $MnSO_4$

These complex salts are used in the form of solutions. The preferable solvents are water, alcohols, acetones or mixtures thereof.

The crosslinking of the membrane is achieved by contacting the membrane or protomembrane with crosslinking reagents. Such treatment can be done in several ways.

(a) contacting the protomembrane with crosslinking reagents (neutralization reagents plus crosslinking metal salts) in a rinse medium,
(b) contacting the protomembrane with neutralization reagents in a rinse medium followed by soaking the rinsed membrane in a solution of crosslinking metal salts (post-treatment),
(c) soaking the rinsed membrane in a solution of crosslinking reagents (post-treatment),
(d) contacting the rinsed membrane with a solution of crosslinking reagents such as a brine solution in reverse osmosis equipment (post-treatment),
(e) contacting a polymer solution or dope solution with crosslinking reagents before of after casting it on a supporting material,
(f) contacting a protomembrane with a crosslinking reagent before rinsing,
(g) mixed treatments such as contacting polymer solution, dope or protomembrane with neutralization reagents first and afterwards contacting with crosslinking metal salts.

(neutralization reagents are not always necessary in case of a polymer containing sulfonic acid or in case that hydroxides, carbonates or bicarbonates of metals are used.)

The crosslinking procedure is essentially a kind of salt formation of carboxylic acid or sulfonic acid. In case of carboxylic acid it is usually necessary to neutralize the polymer acid with an alkaline (preferably buffer) solution. For metals which precipitate at extreme high pH as hydroxides or hydrated oxides, the upper limit of pH exists.

The pH range can be easily determined experimentally for each metal.

Some metal salts are only soluble below pH 4 or 5, where carboxylic acids hardly dissociate. In such case a two-stage treatment is applicable. The membrane is first neutralized by use of a neutralization reagent selected from the class consisting of hydroxide, carbonate or bicarbonate of alkaline metals or ammonium, such as NaOH, $Na_2CO_3$ or $NH_4OH$, and afterwards the alkaline metal ions or ammonium ion are substituted by crosslinking metals through contact with the solution of the crosslinking reagent.

The concentration depends upon the solubility of said salts, the method of crosslinking, the reaction rate of crosslinking of the membrane, the temperature applied, the relative amount of metal to the membrane, and finally the optimal change of rejection and flux obtained from this treatment.

Low concentrations such as 0.001 wt%, and high concentrations such as 20 wt% or more, are both applicable.

When used in a rinse medium the preferred range is from about 0.05 wt% to 10 wt%. When used in a soak bath as post-treatment the preferred range is from about 0.5 wt% to 10 wt%. When used as a brine solution in reverse osmosis equipment, the preferred range is from about 0.001 wt% to 1.0 wt%.

After this treatment the membrane has unexpectedly high flux with a little lower rejection. It is usually effective to treat a crosslinked membrane with heat or acid in order to obtain higher rejection.

After such treatment the membrane shows higher flux with a better *m*-value than a membrane without crosslinking. This is achieved by the present invention for the first time.

Crosslinking of the membrane is proved in several ways:

(a) Solubility of the Membrane

The membrane without crosslinking is soluble in solvents such as N-methyl pyrrolidone or dimethylacetamide, for the polymer is substantially linear. After crosslinking treatment the membrane is insoluble in such solvents.

(b) Infra Red Spectra

The carboxylic acid group of the original polymer shows a strong bond around 1680–1720 $cm^{-1}$, but the carboxylate group of the crosslinked polymer shows a bond around 1560–1600 $cm^{-1}$ in infra-red spectra.

(c) Scanning Electron Microscope X-ray Microanalyzer (SEM-XMA)

SEM-XMA shows the distribution of crosslinking metals along the cross section of the membrane.

The procedure for the analysis is as follows:

An upper skin layer of dried membrane at room temperature is fixed on a specimen box made of carbon by means of a polyvinyl acetate adhesive. The dried membrane is coated with carbon under vacuum. Then, an electron beam is scanned over the specimen. The intensities of characteristic x-ray emitted from some arbitrary spots of the specimen is measured to determine whether or not the metals added as cross-linking agents are distributed uniformly in the membrane.

(d) Electron Spectroscopy for Chemical Analysis (ESCA)

ESCA shows the chemical state of crosslinking metals and counter ions in the surface layer of the membrane to clarify whether the membrane is crosslinked or not.

For example, if the membrane contains a magnesium ion and not any counter ion except the carboxylate anion, it is established that the membrane is crosslinked by magnesium. That is, a membrane of aromatic polyamide having $—CO_2H$ was treated with $MgCl_2$ according to the present invention when examined by ESCA revealed that:

(1) Mg had reacted with the polymer. The amount of the reacted Mg was about one-half the equivalent of $—CO_2H$ groups in the polymer.

(2) $Cl^-$ was not found.

(3) $O^{1s}$ peak width at one-half height decreased in comparison with the control sample which was not treated with $MgCl_2$, which indicates the formation of the carboxylic acid salt ($—COOM_g$).

From the above results, it was found that crosslinking had taken place by the formation of the bonding —

COO—Mg—OOC—, and that $—CO_2H$ groups had participated in this cross-linking reaction.

(e) Elemental Analysis

Metals are analyzed to observe the concentration of the metals in the membrane.

A membrane thus crosslinked has an extremely increased flux with a rather lower rejection, as compared to the same membrane without crosslinking. It is usually valuable to treat a crosslinked membrane by heat and/or acid in order to obtain a rejection as high as or higher than that of the membrane without crosslinking.

The heat treatment can be done in hot water or a water mixture above 50° C, with or without tension. Although the upper limit of the temperature depends upon the polymer structure, it is usually under about 150° C.

The acid treatment can be performed in acidic water or an aqueous mixture having a pH between 0.0 and 4.0. Although almost every kind of acid can be used as long as it dissolves in water or such a mixture, it is preferable to use one or more of the following acids: $H_2SO_4$, HCl, $H_3PO_4$, $HNO_3$, $HClO_4$, acetic acid, formic acid, oxalic acid.

After such treatment, the membrane possesses a higher flux and a better m-value than the same membrane without crosslinking at the same level of rejection, that is a major purpose of the present invention.

(5) Membrane Evaluation

Reverse osmosis performance is usually tested by applying a feed brine with pressure on the skin side (active layer) of the membrane to get the desalted permeate from the bottom side (porous layer). Feed brine is passed across the membrane surface with enough flow rate or stirred with enough speed to exclude concentration polarization which spoils the membrane performance. The membrane is usually supported by a porous metal plate in the test machine.

The membrane performance is expressed in terms of water flux and salt rejection as follows.

Flux = the volume of permeate through the unit membrane area per unit of time ($cm^3/m^2$ day)

Rejection =

$$\left(1 - \frac{\text{Salt Concentration of Permeate}}{\text{Salt Concentration of Feed Brine}}\right) \times 100\ (\%)$$

Both flux and rejection depend upon applied pressure, temperature, salt concentration and pH of the solution. The membrane performances in the following examples were obtained at 30 $kg/cm^2$ of applied pressure, 1500 ppm of sodium chloride, 25° C and pH = 7 if not otherwise stated. m-values are obtained through long time operation for at least 100 hours.

EXAMPLE 1

A 19.09g portion of 3,3'-methylenebis (anthranilic acid) and a 10.82g portion of m-phenylenediamine were dissolved into a 210g portion of N-methyl-2-pyrrolidone and a 77.44g portion of propylene oxide was added under 20° C. A 16.92g portion of isophthaloyl chloride and a 16.92g portion of terephthaloyl chloride were added dropwise with vigorous stirring. The solution became viscous. After stirring for 1.5 hours the unreacted propylene oxide was evaporated under vacuum. The resulting polymer had $\eta$ inh of 1.09.

By using this polymer solution, a dope having the following composition was prepared: polyamide 16.0 wt%, lithium chloride 7.4 wt%, N-methylpyrrolidone 68.9 wt%, dimethylacetamide 7.7 wt%. A portion of the dope was poured onto a glass plate by using a doctor knife followed by drying the dope on the glass a 120° C for 10 minutes in a dryer having a circulating hot air system. The partially dried membrane, "protomembrane", on the glass was rinsed in a water bath which contained 0.25 wt% magnesium chloride, 0.02 wt% sodium carbonate and 0.10 wt% sodium bicarbonate (magnesium chloride buffer solution, pH = 8.7) at 30° C for 20 minutes. The membrane was peeled off when rinsing the protomembrane. The membrane was rinsed in distilled water for 1 hour.

The membrane thus obtained contained a magnesium equivalent of 30% of substitutive carboxylic group. When soaked into a dimethyl-acetamide, this membrane did not dissolve but only swelled. Initial modulus stress at yield and stress at break were 14.4 $kg/mm^2$, 0.54 $kg/mm^2$ and 0.93 $kg/mm^2$ respectively.

Under standard test conditions the membrane performance was as follows:

Flux = 1.72$m^3/m^2$·day, Rejection = 87.4%, m = −0.040.

This membrane was soaked in hot distilled water at 90° C for 5 minutes under tension. After this treatment the membrane performance was as follows:

Flux = 0.87$m^3/m^2$·day, Rejection = 97.1%, m = −0.014.

Alternately this membrane was soaked in a pH 3 solution of sulfuric acid for 2 hours under tension. After this treatment the membrane performance was as follows:

Flux = 0.98$m^3/m^2$·day, Rejection = 96.5%, m = −0.011.

Instead of the acid treatment just above, the membrane was soaked in a pH = 1 solution of sulfuric acid for 15 hours. After this treatment the membrane performance under standard test conditions was as follows:

Flux = 0.44$m^3/m^2$·day, Rejection = 99.45%, m = −0.002.

The membrane performance at 70$kg/cm^2$ with a 35,000 ppm solution of sodium chloride was as follows:

Flux = 0.60$m^3/m^2$·day, Rejection = 99.08%, m = −0.050.

Meanwhile a comparative membrane was obtained by dipping the protomembrane described earlier into distilled water at 30° C instead of the magnesium chloride buffer solution. This membrane dissolved in dimethylacetamide completely. The membrane performance under standard test conditions was as follows:

Flux = 0.63$m^3/m^2$·day, Rejection = 96.9%, m = −0.044.

This comparative membrane was soaked in hot distilled water at 90° C for 5 minutes under tension. After this treatment the membrane performance was as follows:

Flux = $0.58m^3/m^2$·day, Rejection = 98.2%, m = −0.020.

This comparative membrane was soaked in a pH = 1 solution of sulfuric acid for 15 hours. After this treatment the membrane performance under standard test conditions was as follows:

Flux = $0.34m^3/m^2$·day, Rejection = 99.55%, m = −0.005.

The membrane performance at $70kg/cm^2$ with a 35,000 ppm solution of sodium chloride was as follows:

Flux = $0.48m^3/m^2$·day, Rejection = 99.18%, m = −0.12.

It is now quite apparent that the membrane crosslinked by magnesium shows unexpectedly high water flux and, after heat treatment or acid treatment, higher flux and better m-value than the non-crosslinked comparative membrane, at the same rejection performance.

Another comparative membrane was obtained by dipping the protomembrane into a water bath containing 0.25 wt% magnesium chloride only (pH = 5.4). This membrane showed the following performance:

Flux = $0.58m^3/m^2$·day, Rejection = 96.2%

This is practically the same as the former comparative membrane prepared through a water bath. It appears that crosslinking did not take place in both membranes.

EXAMPLE 2

The protomembrane described in Example 1 was dipped into a water bath containing different salts of alkaline earth metals (0.025mol/l) which are conditioned at pH 9 using sodium carbonate and sodium bicarbonate, except the comparative example.

The reverse osmosis performances of these membranes are shown in Table 1.

These membranes showed flux increase as was shown in Example 1.

Table 1

| Example | Metal Salt | Reverse Osmosis Performance Flux($m^3/m^2$. (day) | Rejection(%) |
|---|---|---|---|
| 2-1 | $MgBr_2$ | 1.66 | 89.5 |
| 2-2 | $Mg(ClO_4)_2$ | 1.27 | 95.0 |
| 2-3 | $Mg(OAc)_2$ | 1.65 | 87.3 |
| 2-4 | $Mg(C_2O_4)_2$ | 1.31 | 93.2 |
| 2-5 | $MgSO_4$ | 1.48 | 93.2 |
| 2-6 | $Mg(NO_3)_2$ | 1.71 | 87.3 |
| 2-7 | $(MgCO_3)_4$ $Mg(OH)_2$ | 1.08 | 94.4 |
| 2-8 | $Mg(OH)_2$ | 1.15 | 95.2 |
| 2-9 | $CaCl_2$ | 0.88 | 96.4 |
| 2-10 | $BaCl_2$ | 1.02 | 95.2 |
| 2-11 | $SrCl_2$ | 1.21 | 80.7 |
| Comparative Example | — | 0.63 | 96.9 |

EXAMPLE 3

The protomembrane described in Example 1 was rinsed in a water bath containing 0.10 wt% sodium carbonate and 0.10 wt% of sodium bicarbonate at 30° C for 30 minutes. The membrane performance under the standard condition was as follows:

Flux = $1.90m^3/m^2$·day, Rejection = 62.0%

Afterwards this membrane was soaked in an aqueous cupric sulfate solution of 0.50 mol/l. After washing with distilled water this membrane showed the following performance:

Flux = $1.32m^3/m^2$·day, Rejection = 91.8%

This membrane was colored pale blue which clearly showed the existence of copper. The elemental analysis showed 45% of substitutive carboxylic group was linked to copper.

This membrane was also treated at 90° C and pH 3 as in Example 1 and the resulting membrane performances were as follows:

heat treatment:
Flux = $0.93m^3/m^2$·day, Rejection = 96.8%, m = −0.007.

acid treatment:
Flux = $1.02m^3/m^2$·day, Rejection = 94.4%, m = −0.015.

EXAMPLE 4

The protomembranes were dipped into a water bath containing 0.10 wt% sodium carbonate and 0.10 wt% sodium bicarbonate, as was described in Example 3. They were then soaked in aqueous solutions of different metal salts. The resulting membrane performances are shown in Table 2.

Table 2

| Example | Metal Salts | Reverse Osmosis Performance Flux ($m^3/m^2$ day) | Rejection (%) |
|---|---|---|---|
| 4-1 | $Fe_2(SO_4)_3(NH_4)_2SO_4$ | 1.02 | 89.7 |
| 4-2 | $FeSO_4(NH_4)_2SO_4$ | 1.08 | 92.1 |
| 4-3 | $NiSO_4$ | 1.11 | 93.8 |
| 4-4 | $CoCl_2$ | 1.38 | 90.9 |
| 4-5 | $ZnCl_2$ | 1.65 | 88.6 |
| 4-6 | $AlCl_3$ | 0.92 | 93.3 |
| 4-7 | $CrCl_3$ | 0.97 | 95.1 |
| 4-8 | $MnSO_4$ | 1.63 | 80.8 |
| 4-9 | $SnCl_4$ | 0.79 | 96.5 |
| 4-10 | $(CH_3CO_2)_2Pb$ | 1.65 | 75.8 |
| 4-11 | $TiCl_4$ | 2.01 | 77.8 |
| 4-12 | $VOCl_2$ | 1.60 | 91.1 |
| Comparative Example | — | 0.63 | 96.9 |

EXAMPLE 5

The protomembrane described in Example 1 was dipped into distilled water at 30° C for 30 minutes. The membrane performance was essentially the same as in comparative Example 1. This membrane was then soaked in a water bath containing 2.5 wt% magnesium chloride, 0.02 wt% sodium carbonate and 0.01 wt% sodium bicarbonate for 20 hrs. at 30° C. The membrane thus obtained contained a magnesium amount equivalent to 22% of substitutive carboxylic group. The flux and the rejection of the membrane were 1.42 $m^3/m^2$·day and 91.8% respectively.

EXAMPLE 6

The stoichiometric equivalent of a mixture of 65 mol % of 3,5-diaminobenzoic acid and 35 mol % of p-phenylenediamine, and a mixture of 30 mol % of isophthaloyl chloride and 70 mol % of terephthaloyl chloride were reacted in N-methylpyrrolidone to yield polyamide in essentially the same way as described in Example 1. The ηinh of the polymer was 1.08.

By using this polymer solution, a dope having the following composition was prepared: polyamide 16 wt%, lithium nitrate 6.5 wt%, N-methylpyrrolidone 69.7 wt%, dimethylacetamide 7.8 wt%. A portion of the dope was poured onto a glass plate by using a doctor knife followed by drying the dope on the glass at 120° C for 3 minutes. The partially dried membrane, "protomembrane", was dipped into a water bath containing 0.25 wt% magnesium chloride, 0.02 wt% sodium carbonate, and 0.10 wt% sodium bicarbonate at 30° C. The membrane thus obtained was practically insoluble in dimethylacetamide. The flux and rejection of the membrane were 1.01 $m^3/m^2$·day and 93.6% respectively.

A comparative membrane, prepared by dipping the protomembrane into distilled water at 30° C, was soluble in dimethylacetamide and showed a water flux of 0.77 $m^3/m^2$·day and a salt rejection of 94.0%.

EXAMPLE 7

A 108.14g portion of m-phenylemediamine was dissolved into a 94.0g portion of dimethylacetamide and a 130.56g portion of 4-chloroformylphthalic anhydride was added under cooling with an ice bath. After stirring for 15 minutes, a 77.15g portion of terephthaloyl chloride was added, followed by further stirring. A 313.63g portion of propylene oxide was then added dropwise, followed by further stirring for 2 hours at 20° C. The unreacted propylene oxide was evaporated under vacuum to yield a viscous polymer solution. The ηinh of the polymer was 1.20.

By using this polymer solution, a dope having the following composition was prepared: polyamide 16 wt%, lithium nitrate 6.5 wt%, dimethylacetamide 77.5 wt%.

A protomembrane was prepared from this casting solution according to the same procedure shown in comparative Example 1, except that it was dried at 100° C for 5 minutes.

A partly dried protomembrane was rinsed in a magnesium chloride buffer solution, as described in Example 1, at 30° C for 30 minutes. The membrane thus obtained was practically insoluble in dimethylacetamide. The flux and the rejection of the membrane were 1.56$m^3/m^2$·day and 84.3% respectively.

The membrane was treated with hot water at 85° C for 10 minutes to show an increased rejection of 95.0% with flux of 1.12$m^3/m^2$·day and an m-value of −0.042.

A comparative membrane was prepared by rinsing the protomembrane in distilled water at 30° C. The comparative membrane was soluble in dimethylacetamide and showed the following membrane performance:

Flux = 0.88$m^3/m^2$·day, Rejection = 95.1% and m = −0.081

EXAMPLE 8

A 10.5g portion of highly purified 4-chloroformylphthalic anhydride was dissolved in a 35.0g portion of N-methylpyrrolidone and a 14.5g portion of propylene oxide and cooled to −20° C. A 5.4g portion of 3,3'-dihydroxybenzidine in a 22.9g portion of N-methylpyrrolidone was then added, followed by stirring at −20° C for an hour. Afterwards a 5.7g portion of well-dried and purified 2,2'-dimethyl-4,4'-methylenebisaniline was added at −10° C and stirred for 15 minutes. An 18.5g portion of N-methylpyrrolidone was added successively with vigorous stirring. After stirring 2 hours at room temperature, a viscous solution of hydroxypolyamide acid was obtained. The ηinh of the polymer was 1.24.

The unreacted propylene oxide was evaporated under vacuum to yield a 20.0% polymer solution. By using this polymer solution, a dope having the following composition was prepared: polymer 15.0 wt%, lithium chloride 5.2 wt%, dimethylformamide 25.0 wt%, N-methylpyrrolidone 49.4 wt%, propylene chlorohydrine 3.4 wt% and 2.0 wt.% water.

A protomembrane was prepared from this coating solution according to the same procedure shown in Example 1 except that it was dried at 100° C for 10 minutes. The partly dried protomembrane was rinsed with magnesium chloride buffer solution described in Example 1 at 15° C for an hour. The rinsed membrane was treated with hot water at 80° C for 2 minutes under tension. The membrane performance at 70 kg/$cm^2$ with 35,000 ppm solution of sodium chloride was as follows:

Flux = 0.30$m^3/m^2$·day, Rejection = 98.8% and m = 0.07.

A comparative membrane was prepared by rinsing the protomembrane in distilled water a 15° C. After the same heat treatment as described above, the membrane performance under the same test condition was as follows:

Flux = 0.25$m^3/m^2$·day, Rejection = 98.7% and m = −0.12.

EXAMPLE 9

The stoichiometric equivalent of the mixture of 52 mol % of 3-aminobenzhydrazide, 13 mol % of 4-aminobenzhydrazide and 35 mol % of methylenebis(anthranilic acid), and the mixture of 70 mol % of isophthaloyl chloride and 30 mol % of terephthaloyl chloride were reacted in dimethylacetamide in essentially the same way as described in Example 1. The ηinh of the polymer was 0.93.

By using this polymer solution, a dope having the following composition was prepared: polyamide 15 wt%, lithium nitrate 4.5 wt%, dimethylacetamide 80.5 wt%.

A protomembrane was prepared from this casting solution according to the same procedure shown in Example 1 except that it was dried at 80° C for 15 minutes. The partly dried protomembrane was rinsed with magnesium chloride buffer solution described in Example 1 for an hour. The rinsed membrane showed a flux of 1.01$m^3/m^2$·day and a rejection of 90.3%. The rinsed membrane was treated with dilute sulfuric acid (pH = 1) for 15 hours and then tested at 70 kg/$cm^2$ with a 35,000 ppm solution of sodium chloride. The flux was 0.33 $m^3/m^2$·day, the rejection was 99.35% and the m-value was −0.066.

A comparative membrane was prepared by rinsing the protomembrane in distilled water at 30° C. The flux was 0.75, $m^3/m^2$·day and the rejection was 93.8%. After the same acid treatment as described above, the membrane performance under the same test condition was as follows:

Flux = 0.30 $m^3/m^2$·day, Rejection = 99.18%, m = −0.17.

EXAMPLE 10

A mixture of 5 mol % of 3,3'-methylenebis (anthranilic acid), 45 mol % of m-phenylenediamide, 25 mol % of isophthaloyl chloride and 25 mol % of terephthaloyl chloride were reacted in N-methylpyrrolidone to yield a polyamide as described in Example 1. The ηinh of the polymer was 0.98.

By using this polymer solution a dope having the following composition was prepared: polyamide 16.0 wt%, lithium chloride 7.4 wt%, N-methylpyrrolidone 68.9 wt%, dimethylacetamide 7.7 wt%.

A protomembrane was prepared from this casting solution according to the same procedure shown in Example 1. The partly dried protomembrane was rinsed with magnesium chloride buffer solution described in Example 1 for 24 hours. The performance of the membrane was as follows:

Flux = 1.01 $m^3/m^2$·day, Rejection = 93.3%.

A comparative membrane was prepared by rinsing the protomembrane in distilled water. The performance of the membrane was as follows:

Flux = 0.75 $m^3/m^2$·day, Rejection = 97.2%.

EXAMPLE 11

0.3 mol of m-phenylenediamine and 0.3 mol of pyromellitic acid dianhydride were stirred in 700 ml dimethylacetamide at 50° C for an hour. A 2.5 mol of pyridine and a 0.5 mol of acetic anhydride were added followed by stirring at 50° C for 2 hours, to yield yellow-brown precipitate.

The precipitate was washed with dimethylacetamide and dried sufficiently.

50 g of this polymer was stirred in 350 g of dimethylacetamide adding 9 g of triethanolamine and 15 g of lithium chloride until they made a clear dope solution.

A protomembrane was prepared from this casting solution according to the same procedure shown in Example 1. The partly dried protomembrane was rinsed with a magnesium chloride buffer solution as described in Example 1, except that it was dried at 90° C for 5 minutes. The performance of the membrane was as follows:

Flux = 0.28 $m^3/m^2$·day, Rejection = 93.0%.

A comparative membrane was prepared by dipping the protomembrane in distilled water. The performance of the membrane was as follows:

Flux = 0.12 $m^3/m^2$·day, Rejection = 93.7%.

EXAMPLE 12

The stoichiometric equivalent of a mixture of 75 mol % of m-phenylenediamine and 25 mol % of 2,4-diaminobenzenesulfonic acid, and a mixture of 60 mol % isophthaloyl chloride and 40 mol % of terephthaloyl chloride were reacted in N-methylpyrrolidone in essentially the same way as described in Example 1. The ηinh of the polymer was 1.10.

By using this polymer solution, a dope having the following composition was prepared: polyamide 16.0 wt%, lithium chloride 6.5 wt%, N-methylpyrrolidone 77.5 wt%.

A protomembrane was prepared from this casting solution according to the procedure of Example 1 except that it was dried at 120° C for 20 minutes. The partly dried protomembrane was rinsed with a magnesium chloride buffer solution described in Example 1. The rinsed membrane was treated with dilute sulfuric acid (pH = 1) for 15 hours and then tested at 70 $kg/cm^2$ with a 35,000 ppm solution of sodium chloride. The flux was 0.18 $m^3/m^3$·day, the rejection was 98.8% and the m-value was −0.13.

A comparative membrane was prepared by rinsing the protomembrane in distilled water at 30° C. After the same acid treatment as described above, the membrane performance under the same test conditions was as follows:

Flux = 0.13 $m^3/m^2$·day, Rejection = 98.9%, m = −0.27.

EXAMPLE 13

A membrane was prepared according to the procedure of Example 1, except that the protomembranes were prepared on polyester film(Lumirror ®) instead of a glass plate, and were dried at 120° C for 3 minutes. The membrane performances of the membrane and a comparative membrane prepared by rinsing in distilled water (in parenthesis) were as follows:

Flux = 1.82 $m^3/m^2$·day (0.81 $m^3/m^2$·day), Rejection = 80.8% (92.5%).

EXAMPLE 14

A membrane was prepared according to the same procedure shown in Example 1 except that the protomembrane was prepared on polyester taffeta placed on a glass plate, and dried at 120° C for 3 minutes.

The resulting supported membrane showed the following performance:

Flux = 1.48 $m^3/m^2$·day, Rejection = 90.7%.

A comparative membrane prepared by rinsing the protomembrane in distilled water showed the following performance:

Flux = 0.70 $m^3/m^2$·day, Rejection = 94.8%.

Although this invention has been described with reference to specific forms of protomembranes and membranes, and although reference has been made to a plurality of specific Examples herein, it will be appreciated that the invention is not intended to be limited in its scope by the foregoing disclosures. For example, equivalent elements may be substituted for those specifically shown and described herein, certain steps of the procedures and methods described in the Examples can be eliminated or in some cases reversed in sequence, and other changes may be made, all without departing from the spirit and scope of the invention as defined in the appended claims.

We claim the following:

1. A permselective polymeric membrane consisting essentially of a synthetic organic polyamide or polyhydrazide represented by the following formula:

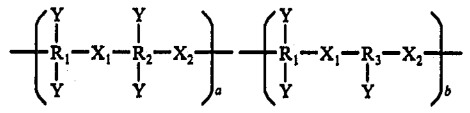

-continued

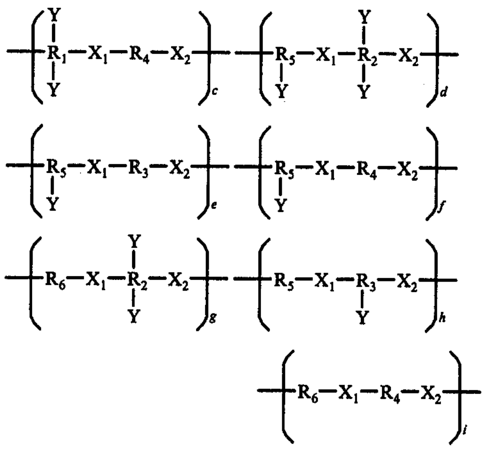

wherein (a) *a, b, c, d, e, f, g, h* and *i* represent the molar fraction (%) of each component, each being larger than zero or equal to zero, and satisfying the following relations:

$$a + b + c + d + e + f + g + h + i = 100$$

$$a + b + c + d + e + f + g + h > 0$$

(b) $R_1$, $R_2$, $R_3$, $R_4$, $R_5$ and $R_6$ are members selected from the group consisting of carbocyclic aromatic, heterocyclic, and alicyclic groups having 4 to 30 carbon atoms, (c) $X_1$ is a group selected from the class consisting of —NHCO—, —CO— and —CONHNHCO—, wherein, in the case of —CO—, it is bonded directly to a nitrogen atom in the heterocycle in $R_1$, $R_5$ or $R_6$, (d) $X_2$ is a group selected from the class consisting of —CONH—, and —CO—, and —CONHNHCO—, wherein, in the case of —CO—, it is bonded directly to a nitrogen atom in the heterocycle in $R_1$, $R_5$ or $R_6$, (e) Y is a group selected from the class consisting of $CO_2H$ and $—SO_3H$, and (f) the polymer has a molecular weight high enough to provide a film, a solvent for the polymer, and an inorganic salt selected from the class consisting of LiCl, LiBr, $LiNO_3$, $CaCl_2$ and $MgCl_2$, the total number of cross-linked groups for divalent metal ions in the polymer repeating units being in the range of $7.0 \times 10^{-5}$ - $7.0 \times 10^{-3}$, the concentration of said ionic groups in the polymer, expressed as P.I., is in the range of $3.5 \times 10^{-4}$ - $1.4 \times 10^{-2}$, where P.I. represents the following ratio;

$$P.I. = \frac{\text{total number of ionic groups in a polymer repeating unit}}{\text{Molecular weight of the polymer repeating unit}}$$

said polyamide or polyhydrazide being ionically cross-linked with a salt of a metal selected from the class consisting of alkaline earth metals, transition metals, aluminum group metals and lead group metals.

2. A membrane of claim 1 wherein the alkaline earth metal is selected from the class consisting of Mg, Ca, Ba and Sr.

3. A membrane of claim 1 wherein the transition metal is selected from the class consisting of Ti, V, Cr, Mo, W, Mn, Fe, Co, Ni, Pd, Cu, Zn, Cd and Hg.

4. A membrane of claim 1 wherein the aluminum group metal is selected from the class consisting of Al, Ga and In.

5. A membrane of claim 1 wherein the lead group metal is selected from the class consisting of Sn and Pb.

6. A membrane of claim 1 wherein the following relationship is satisfied:

$$a + b + c \geqq 5$$

7. A method of preparing a permselective polymeric membrane which comprises the steps of casting a dope on a supporting material, removing about 20 to 80% of the solvent contained in the dope to obtain a protomembrane, and rinsing the protomembrane with a rinse medium containing a salt of metal selected from the class consisting of alkaline earth metals, transition metals, aluminum group metals and lead group metals, with or without a neutralization reagent, said dope comprising a synthetic organic polyamide or polyhydrazide, represented by the following formula:

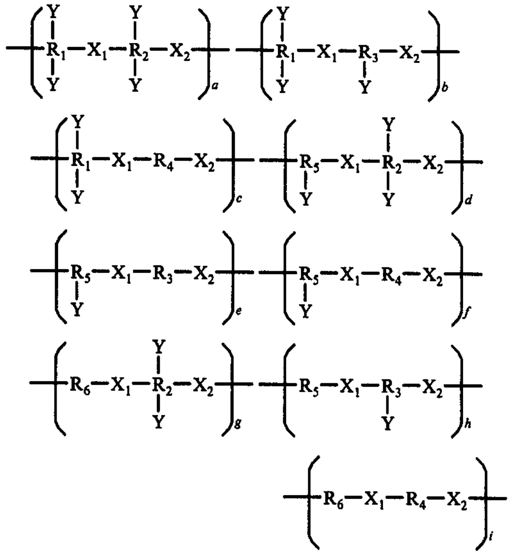

wherein (a) *a, b, c, d, e, f, g, h,* and *i* represent the molar fraction (%) of each component, each being larger than zero or equal to zero, and satisfying the following relations:

$$a + b + c + d + e + f + g + h + i = 100$$
$$a + b + c + d + e + f + g + h > 0$$

(b) $R_1$, $R_2$, $R_3$, $R_4$, $R_5$ and $R_6$ are members selected from the group consisting of carbocyclic aromatic, heterocyclic, and alicyclic groups having 4 to 30 carbon atoms, (c) $X_1$ is a group selected from the class consisting of —NHCO—, —CO—, and —CONHNHCO, wherein, in the case of —CO—, it is bonded directly to a nitrogen atom in the heterocycle in $R_1$, $R_5$, or $R_6$, (d) $X_2$ is a group selected from the class consisting of —CONH—, —CO—, and —CONHNHCO—, wherein, in the case of —CO—, it is bonded directly to a nitrogen atom in the heterocycle in $R_1$, $R_5$, or $R_6$, (e) Y is a group selected from the class consisting of $-CO_2H$ and $-SO_3H$, and (f) the polymer has a molecular weight high enough to provide a film, a solvent for the polymer, and an inorganic salt selected from the class consisting of LiCl, LiBr, $LiNO_3$, $CaCl_2$ and $MgCl_2$, the total number of cross-linked groups for divalent metal ions in the polymer repeating unit being in the range of $7.0 \times 10^{-5}$ - $7.0 \times 10^{-3}$, the concentration of said ionic groups in the polymer, expressed as P.I., is in the range of $3.5 \times 10^{-4}$ - $1.4 \times 10^{-2}$, where P.I. represents the following ratio:

$$P.I. = \frac{\text{total number of ionic groups in a polymer repeating unit}}{\text{Molecular weight of the polymer repeating unit}}$$

whereby said polyamide or polyhydrazide is ionically cross-linked with a salt of a metal selected from the class consisting of alkaline earth metals, transition metals, aluminum group metals and lead group metals.

8. A method of claim 7 wherein the neutralization reagent is selected from the class consisting of hyroxide, carbonate or bicarbonate of alkaline metals and ammonium.

9. A method of preparing a permselective polymeric membrane which comprises the steps of casting a dope on a supporting material, removing about 20% to 80% of the solvent contained in the dope to obtain a protomembrane, rinsing the protomembrane with a rinse medium containing a neutralization reagent and treating the rinsed membrane with a salt of a metal selected from the class consisting of alkaline earth metals, transition metals, aluminum group metals and lead group metals, said dope comprising a synthetic organic polyamide or polyhydrazide represented by the following formula:

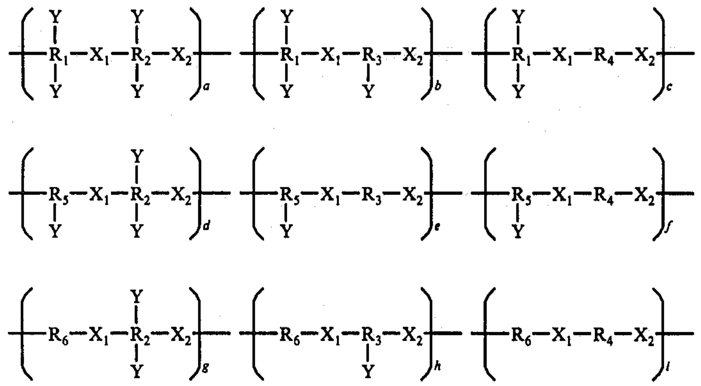

wherein (a) *a, b, c, d, e, f, g, h* and *i* represent the molar fraction (%) of each component, each being larger than zero or equal to zero, and satisfying the following relations:

$$a + b + c + d + e + f + g + h + i = 100$$

$$a + b + c + d + e + f + g + h > 0$$

(b) $R_1$, $R_2$, $R_3$, $R_4$, $R_5$ and $R_6$ are members selected from the group consisting of carbocyclic aromatic, heterocyclic and alicyclic groups having 4 to 30 carbon atoms, (c) $X_1$ is a group selected from the class consisting of —NHCO—, —CO— and —CONHNHCO—, wherein in the case of —CO—, it is bonded directly to a nitrogen atom in the heterocycle in $R_1$, $R_5$, or $R_6$.

(d) $X_2$ is a group selected from the class consisting of —COHN—, —CO—, and —CONHNHOC—, wherein, in the case of —CO—, it is bonded directly to a nitrogen atom in the heterocycle in $R_1$, $R_5$, or $R_6$.

(e) Y is a group selected from the class consisting of $-CO_2H$ and $-SO_3H$.

(f) The polymer has a molecular weight high enough to provide a film, a solvent for the polymer, and an inorganic salt selected from the class consisting of LiCl, LiBr, $LiNO_3$, $CaCl_2$, and $MgCl_2$, the total number of cross-linked groups for divalent metal ions in the polymer replating unit being in the range of $7.0 \times 10^{-5}$ - $7.0 \times 10^{-3}$, the concentration of said ionic groups in the polymer, expressed as P.I., is in the range of $3.5 \times 10^{-4}$ - $1.4 \times 10^{-2}$, where P.I. represents the following ratio:

$$P.I. = \frac{\text{total number of ionic groups in a polymer repeating unit}}{\text{Molecular weight of the polymer repeating unit}}$$

whereby said polyamide or polyhydrazide is ionically cross-linked with a salt of a metal selected from the class consisting of alkaline earth metals, transition metals, aluminum group metals and lead group metals.

10. A method of claim 9 wherein the neutralization reagent is selected from the class consisting of a hydroxide, carbonate or bicarbonate of alkaline metals and ammonium.

11. A method of preparing a permselective polymeric membrane which comprises the steps of casting a dope on a supporting material, removing about 20% to 80% of the solvent contained in the dope to obtain a protomembrane, rinsing the protomembrane with a rinse medium, and treating the rinsed membrane with a salt of a metal selected from the class consisting of alkaline earth metals, transition metals, aluminum group metals and lead group metals with or without a neutralization reagent, said dope comprising a synthetic organic polyamide or polyhydrazide represented by the following formula:

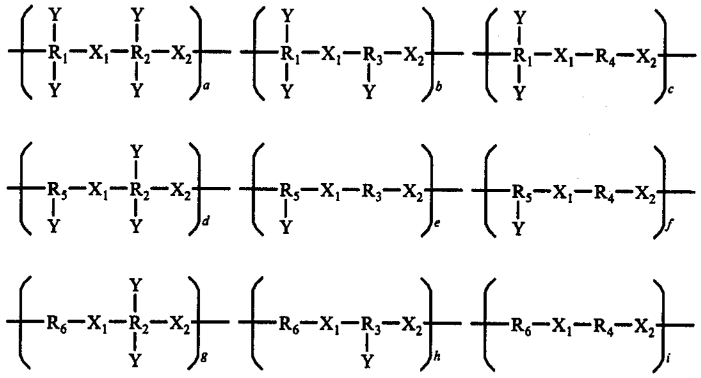

wherein (a) $a, b, c, d, e, f, g, h$ and $i$ represent the molar fraction (%) of each component, each being larger than zero or equal to zero, and satisfying the following relations:

$$a + b + c + d + e + f + g + h + i = 100$$

$$a + b + c + d + e + f + g + h >$$

(b) $R_1$, $R_2$, $R_3$, $R_4$, $R_5$, and $R_6$ are members selected from the group consisting of carbocyclic aromatic, heterocyclic and alicyclic groups having 4 to 30 carbon atoms, (c) $X_1$ is a group selected from the class consisting of —NHCO—, —CO—, and —CONHNHCO—, wherein, in the case of —CO—, it is bonded directly to a nitrogen atom in the heterocycle in $R_1$, $R_5$, or $R_6$, (d) $X_2$ is a group selected from the class consisting of —CONH—, —CO—, and —CONHNHCO—, wherein, in the case of —CO—, it is bonded directly to a nitrogen atom in the heterocycle in $R_1$, $R_5$, or $R_6$.

(e) Y is a group selected from the class consisting of $—CO_2H$ ond $—SO_3H$.

(f) The polymer has a molecular weight high enough to provide a film, a solvent for the polymer, and an inorganic salt selected from the class consisting of LiCl, LiBr, $LiNO_3$, $CaCl_2$, and $MgCl_2$, the total number of crosslinked groups for divalent metal ions in the polymer repeating unit being in the range of $7.0 \times 10^{-5} - 7.0 \times 10^{-3}$, the concentration of said ionic groups in the polymer expressed as P.I., is in the range of $3.5 \times 10^{-4} - 1.4 \times 10^{-2}$, where P.I. represents the following ratio:

$$P.I. = \frac{\text{total number of ionic groups in a polymer repeating unit}}{\text{Molecular weight of the polymer repeating unit}}$$

whereby said polyamide or polyhydrazide is ionically cross-linked with a salt of a metal selected from the class consisting of alkaline earth metals, transition metals, aluminum group metals and lead group metals.

12. The method of claim 11 wherein the neutralization reagent is selected from the class consisting of hydroxide, carbonate or bicarbonate of alkaline metals and ammonium.

13. The method of claim 7 wherein the membrane is further treated in hot water or water mixture between 50° C and 150° C.

14. The method of claim 7 wherein the membrane is further treated in acidic water or a water mixture at the pH between 0.0 and 4.0.

15. The method of claim 9 wherein the membrane is further treated in hot water or water mixture between 50° C and 150° C.

16. The method of claim 9 wherein the membrane is further treated in acidic water or a water mixture at the pH between 0.0 and 4.0.

17. The method of claim 11 wherein the membrane is further treated in hot water or water mixture between 50° C and 150° C.

18. The method of claim 11 wherein the membrane is further treated in acidic water or a water mixture at the pH between 0.0 and 4.0.

19. A permselective polymeric membrane consisting essentially of a synthetic organic polyamide represented by the following formula:

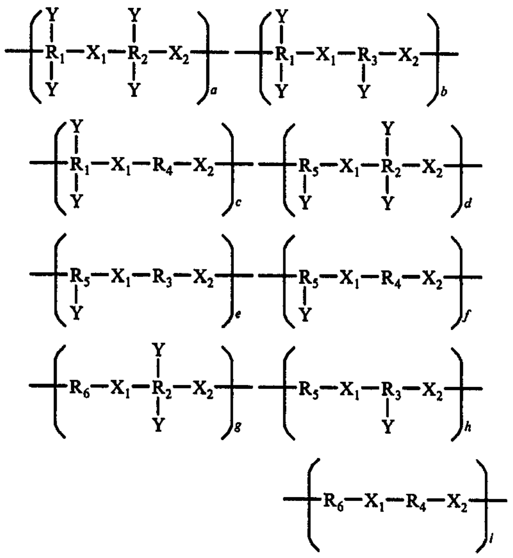

wherein (a) $a, b, c, d, e, f, g, h$, and $i$ represent the molar fraction (%) of each component, each being larger than zero or equal to zero, and satisfying the following relations:

$$a + b + c + d + e + f + g + h + i = 100$$

$$a + b + c + d + e + f + g + h > 0$$

(b) $R_1$, $R_2$, $R_3$, $R_4$, $R_5$, and $R_6$ are members selected from the group consisting of carbocyclic aromatic, heterocyclic, and alicyclic groups having 4 to 30 carbon atoms, (c) $X_1$ is a group selected from the class consisting of —NHCO— and —CO—, wherein, in the case of —CO—, it is bonded directly to a nitrogen atom in the heterocycle in $R_1$, $R_5$ or $R_6$, (d) $X_2$ is a group selected from the class consisting of —CONH— and —CO—, wherein, in the case of —CO—, it is bonded directly to a nitrogen atom in the heterocycle in $R_1$, $R_5$ or $R_6$, (e) Y is a group selected from the class consisting of $—CO_2H$ and $—SO_3H$, and (f) the polymer has a molecular weight high enough to provide a film, a solvent for the polymer, and an inorganic salt selected from the class consisting of LiCl, LiBr, $LiNO_3$, $CaCl_2$ and $MgCl_2$, the total number of crosslinked groups for divalent, metal ions in the polymer repeating unit being in the range of $7.0 \times 10^{-5} - 7.0 \times 10^{-3}$, the concentration of said ionic groups in the polymer, expressed as P.I., is in the range of $3.5 \times 10^{-4} - 1.4 \times 10^{-2}$, where P.I. represents the following ratio:

$$P.I. = \frac{\text{total number of ionic groups in a polymer repeating unit}}{\text{Molecular weight of the polymer repeating unit}}$$

said polyamide being ionically crosslinked with a salt of a metal selected from the class consisting of alkaline earth metals, transition metals, aluminum group metals and lead group metals.

20. A method of preparing a permselective polymeric membrane which comprises the steps of casting a dope on a supporting material, removing about 20 to 80% of the solvent contained in the dope to obtain a protomembrane, and rinsing the protomembrane with a rinse medium containing a salt of metal selected from the class consisting of alkaline earth metals, with or without a neutralization reagent, said dope comprising a synthetic organic polyamide, represented by the following formula:

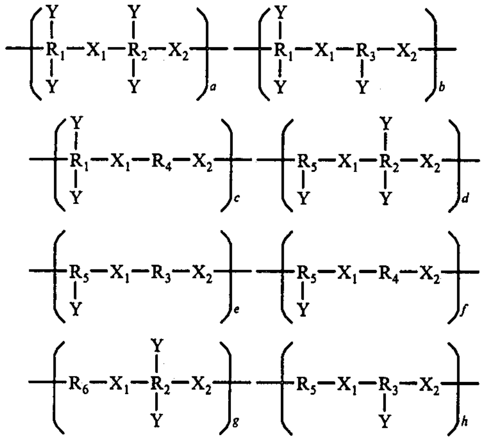

-continued

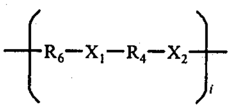

wherein (a) *a, b, c, d, e, f, g, h,* and *i* represent the molar fraction (%) of each component, each being larger than zero or equal to zero, and satisfying the following relations:

$$a + b + c + d + e + f + g + h + i = 100$$

$$a + b + c + d + e + f + g + h > 0$$

(b) $R_1$, $R_2$, $R_3$, $R_4$, $R_5$ and $R_6$ are members selected from the group consisting of carbocyclic aromatic, heterocyclic, and alicyclic groups having 4 to 30 carbon atoms, (c) $X_1$ is a group selected from the class consisting of —NHCO— and —CO—, wherein, in the case of —CO—, it is bonded directly to a nitrogen atom in the heterocycle in $R_1$, $R_5$, or $R_6$, (d) $X_2$ is a group selected from the class consisting of —CONH— and —CO—, wherein in the case of —CO—, it is bonded directly to a nitrogen atom in the heterocycle in $R_1$, $R_5$, or $R_6$, (e) Y is a group selected from the class consisting of $—CO_2H$ and $—SO_3H$, and (f) the polymer has a molecular weight high enough to provide a film, a solvent for the polymer, and an inorganic salt selected from the class consisting of LiCl, LiBr, $LiNO_3$, $CaCl_2$ and $MgCl_2$, the total number of cross-linked groups for divalent metal ions in the polymer repeating unit being in the range of $7.0 \times 10^{-5} - 7.0 \times 10^{-3}$, the concentration of said ionic groups in the polymer, expressed as P.I., is in the range of $3.5 \times 10^{-4} - 1.4 \times 10^{-2}$, where P.I. represents the following ratio:

$$P.I. = \frac{\text{total number of ionic groups in a polymer repeating unit}}{\text{Molecular weight of the polymer repeating unit}}\,,$$

whereby said polyamide or polyhydrazide is ionically cross-linked with a salt of a metal selected from the class consisting of alkaline earth metals, transition metals, aluminum group metals and lead group metals.

21. A method of preparing a permselective polymeric membrane which comprises the steps of casting a dope on a supporting material, removing about 20 to 80% of the solvent contained in the dope to obtain a protomembrane, rinsing the protomembrane with a rinse medium containing a neutralization reagent and treating the rinsed membrane with a salt of a metal selected from the class consisting of alkaline earth metals, transition metals, aluminum group metals and lead group metals said dope comprising a synthetic organic polyamide represented by the following forumla:

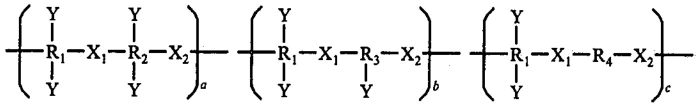

-continued

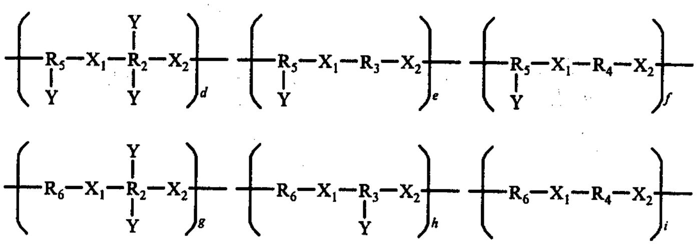

wherein (a) *a, b, c, d, e, f, g, h,* and *i* represent the molar fraction (%) of each component, each being larger than zero or equal to zero, and satisfying the following relations:

$$a + b + c + d + e + f + g + h + i = 100$$

$$a + b + c + d + e + f + g + h > 0$$

(b) $R_1$, $R_2$, $R_3$, $R_4$, $R_5$ and $R_6$ are members selected from the group consisting of carbocyclic aromatic, heterocyclic and alicyclic groups having 4 to 30 carbon atoms, (c) $X_1$ is a group selected from the class consisting of —NHCO— and —CO—, wherein, in the case of —CO—, it is bonded directly to a nitrogen atom in their heterocycle in $R_1$, $R_5$, or $R_6$, (d) $X_2$ is a group selected from the class consisting of —CONH— and —CO—, wherein, in the case of —CO—, it is bonded directly to a nitrogen atom in the heterocycle in $R_1$, $R_5$, or $R_6$, (e) Y is a group selected from the class consisting of $—CO_2H$ and $—SO_3H$, and (f) the polymer has a molecular weight high enough to provide a film, a solvent for the polymer, and an inorganic salt selected from the class consisting of LiCl, LiBr, $LiNO_3$, $CaCl_2$, and $MgCl_2$, the total number of cross-linked groups for divalent metal ions in the polymer repeating unit being in the range of $7.0 \times 10^{-5}$ - $7.0 \times 10^{-3}$, the concentration of said ionic groups in the polymer, expressed as P.I., is in the range of $3.5 \times 10^{-4}$ - $1.4 \times 10^{-2}$, where P.I. represents the following ratio:

$$P.I. = \frac{\text{total number of ionic groups in a polymer repeating unit}}{\text{Molecular weight of the polymer repeating unit}}\ ,$$

whereby said polyamide or polyhydrazide is ionically cross-linked with a salt of a metal selected from the class consisting of alkaline earth metals, transition metals, aluminum group metals and lead group metals.

22. A method of preparing a permselective polymeric membrane which comprises the steps of casting a dope on a supporting material, removing about 20 to 80% of the solvent contained in the dope to obtain a protomembrane, rinsing the protomembrane with a rinse medium, and treating the rinsed membrane with a salt of a metal selected from the class consisting of alkaline earth metals, transition metals, aluminum group metals and lead group metals with or without a neutralization reagent, said dope comprising a synthetic organic polyamide, represented by the following formula:

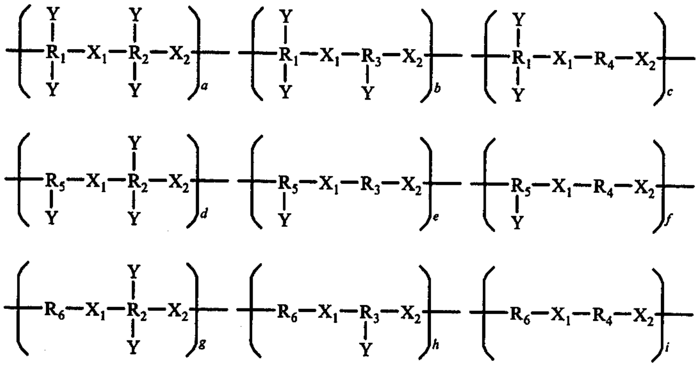

wherein (a) *a, b, c, d, e, f, g, h* and *i* represent the molar fraction (%) of each component, each being larger than zero or equal to zero, and satisfying the following relations:

$$a + b + c + d + e + f + g + h + i = 100$$

$$a + b + c + d + e + f + g + h > 0$$

(b) $R_1$, $R_2$, $R_3$, $R_4$, $R_5$ and $R_6$ are members selected from the group consisting of carbocyclic aromatic, heterocyclic and alicyclic groups having 4 to 30 carbon atoms, (c) $X_1$ is a group selected from the class consisting of —NHCO— and —CO—, wherein in the case of —CO—, it is bonded directly to a nitrogen atom in the heterocycle in $R_1$, $R_5$ or $R_6$, (d) $X_2$ is a group selected from the class consisting of —CONH— and —CO—, wherein, in the case of —CO—, it is bonded directly to a nitrogen atom in the heterocycle in $R_1$, $R_5$ or $R_6$;

(e) Y is a group selected from the class consisting of $—CO_2H$ and $—SO_3H$, and (f) the polymer has a molecular weight high enough to provide a film, a solvent for the polymer, and an inorganic salt selected from the class consisting of LiCl, LiBr, $LiNO_3$, $CaCl_2$ and $MgCl_2$, the total number of cross-linked groups for divalent metal ions in the polymer repeating end being in the range of $7.0 \times 10^{-5}$ - $7.0 \times 10^{-3}$, the concentration of said ionic groups in the polymer, expressed as P.I., is in the range of $3.5 \times 10^{-4}$ - $1.4 \times 10^{-2}$, where P.I. represents the following ratio:

$$P.I. = \frac{\text{total number of ionic groups in a polymer repeating unit}}{\text{Molecular weight of the polymer repeating unit}}.$$

whereby said polyamide or polyhydrazide is ionically cross-linked with a salt of a metal selected from the class consisting of alkaline earth metals, transition metals, aluminum group metals and lead group metals.

* * * * *